(12) United States Patent
Gui et al.

(10) Patent No.: US 10,338,306 B2
(45) Date of Patent: Jul. 2, 2019

(54) EDGE-LIT LIGHT GUIDE DEVICE WITH LIGHT SOURCE AND LIGHT GUIDE END RECEIVED IN RECEIVING GROOVE OF COVER, AND METAL FRAME

(71) Applicant: OPPLE LIGHTING CO., LTD., Shanghai (CN)

(72) Inventors: Liangyin Gui, Shanghai (CN); Guolong Ni, Shanghai (CN); Guobao Zhang, Shanghai (CN)

(73) Assignee: OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 15/928,460

(22) Filed: Mar. 22, 2018

(65) Prior Publication Data

US 2018/0275338 A1 Sep. 27, 2018

(30) Foreign Application Priority Data

Mar. 23, 2017 (CN) .................... 2017 2 0292194 U (51) Int. Cl.
*G09F 13/04* (2006.01)
*F21V 8/00* (2006.01)

(52) U.S. Cl.
CPC .......... *G02B 6/0088* (2013.01); *G02B 6/009* (2013.01); *G02B 6/0051* (2013.01); *G02B 6/0055* (2013.01); *G02B 6/0065* (2013.01)

(58) Field of Classification Search
CPC ....... G09F 2013/0445; G09F 2013/049; G09F 2013/1836; G09F 2013/1881; F21V 17/10; F21V 19/0035

USPC ......................................... 362/632, 633, 634
See application file for complete search history.

(56) References Cited

U.S. PATENT DOCUMENTS

| | | | | |
|---|---|---|---|---|
| 6,285,420 B1 * | 9/2001 | Mizumo | ............... | G02B 6/0056 349/65 |
| 6,502,945 B2 * | 1/2003 | Kim | .................... | G02B 6/0031 349/64 |
| 6,513,944 B2 * | 2/2003 | Chou | ...................... | F21V 19/04 349/58 |
| 6,811,276 B2 * | 11/2004 | Moon | .................. | G02B 6/0021 362/23.16 |
| 6,974,242 B1 * | 12/2005 | Chu | ................. | G02F 1/133308 362/633 |
| 7,360,941 B2 * | 4/2008 | Yoon | .................... | G02B 6/0068 349/58 |
| 7,607,812 B2 * | 10/2009 | Kim | ......................... | F21S 8/033 362/602 |
| 7,611,274 B2 * | 11/2009 | Hsiao | ..................... | G02B 6/009 362/613 |
| 7,800,711 B2 * | 9/2010 | Kim | ..................... | G02B 6/0031 349/65 |
| 8,292,489 B2 * | 10/2012 | Chiu | .................... | G02B 6/0081 362/634 |

(Continued)

Primary Examiner — Ismael Negron
(74) *Attorney, Agent, or Firm* — Arch & Lake LLP (57) ABSTRACT

The lighting device includes a cover with a receiving chamber defined between a top wall and a side wall extending downwards from the top wall; an insulation component located on an inner surface of the side wall and having a receiving groove; a light source assembly located in the receiving groove; a light guide assembly received in the receiving chamber with an end received in the receiving groove; and a metal frame fixed at a periphery of the cover.

20 Claims, 7 Drawing Sheets

(56) References Cited

U.S. PATENT DOCUMENTS

| | | | | |
|---|---|---|---|---|
| 8,587,746 B2* | 11/2013 | Kim | ................... | G02B 6/0088 |
| | | | | 349/61 |
| 8,944,667 B2* | 2/2015 | Shin | ................... | G02B 6/0091 |
| | | | | 362/632 |
| 2012/0099341 A1* | 4/2012 | Kwon | ................ | G02B 6/0085 |
| | | | | 362/612 |

* cited by examiner

EDGE-LIT LIGHT GUIDE DEVICE WITH LIGHT SOURCE AND LIGHT GUIDE END RECEIVED IN RECEIVING GROOVE OF COVER, AND METAL FRAME

CROSS-REFERENCE TO RELATED APPLICATIONS

This application is based upon and claims priority to Chinese Application No. 201720292194.6 filed Mar. 23, 2017, the entire content of which is incorporated herein by reference for all purpose.

TECHNICAL FIELD

The present disclosure relates to the field of lighting technology, and particularly to a lighting device of a flat panel type.

BACKGROUND

Light-emitting diode (LED) panel lamp is a kind of lighting device with characteristics such as ultra-thin thickness, ultra-bright light, super energy-saving property and environmental protection. It is mainly used in places required for energy-saving illumination with high color rendering index such as residences, hotels, public facilities, schools and hospitals. An existing LED panel lamp includes a metal shell in which a heat conduction circuit board, an LED lamp, a light reflecting film, a light guide plate and a diffusion plate are disposed. The diffusion plate and the light reflecting film are both connected with the light guide plate. The LED lamp is mounted on the heat conduction circuit board.

SUMMARY

The present disclosure provides a lighting device and a method of producing a lighting device.

According to a first aspect, a lighting device is provided. The lighting device may include a cover having a top wall and a side wall extending downwards from the top wall, and a receiving chamber being delimited by the top wall and the side wall; an insulation component that is located on an inner surface of the side wall of the cover and provided with a receiving groove or is an insulating layer attached onto the inner surface of the side wall of the cover; a light source assembly located on a surface of an inner wall of the receiving groove of the insulation component; a light guide assembly received in the receiving chamber of the cover, where the light guide assembly includes an end received in the receiving groove of the insulation component; and a metal frame fixed at a periphery of the cover.

According to a second aspect, a method of producing a lighting device is provided. The method may include providing a cover that has a top wall and a side wall extending downwards from the top wall, and providing a receiving chamber that is delimited by the top wall and the side wall; providing an insulation component that is located on an inner surface of the side wall of the cover and provided with a receiving groove or is an insulating layer attached onto the inner surface of the side wall of the cover; providing a light source assembly that is located on a surface of an inner wall of the receiving groove of the insulation component; providing a light guide assembly that is received in the receiving chamber of the cover, where the light guide assembly includes an end received in the receiving groove of the insulation component; and fixing a metal frame at a periphery of the cover.

It is to be understood that both the foregoing general description and the following detailed description are exemplary and explanatory only and are not restrictive of the present disclosure.

BRIEF DESCRIPTION OF THE DRAWINGS

The drawings described herein are used to provide a further understanding of the present disclosure and constitute a part of the present disclosure. The exemplary examples of the present disclosure and the descriptions thereof are used to explain the present disclosure but not to constitute improper limitations to the present disclosure. In the drawings.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

In order to make objects, technical details and advantages of the examples of the disclosure apparent, the technical solutions of the examples will be described in a clearly and fully understandable way in connection with the drawings related to the examples of the disclosure. Apparently, the described examples are just a part but not all of the examples of the disclosure. Based on the described examples herein, those skilled in the art can obtain other example(s), without any inventive work, which should be within the scope of the disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

The problem exists for LED panel lamp. For example, the LED panel lamp may not have enough space for electrical insulation design, so an electrical insulation performance of the whole lamp is generally poor, and an isolated power supply is used. That is, a voltage provided for the LED lamp is reduced to be less than 30V, which increases the cost. Moreover, because a creepage distance between the heat conduction circuit board and the metal shell is too small, the entire LED panel lamp is often unable to pass a withstanding voltage test.

As illustrated in FIGS. 1-9, the present example provides a lighting device 100, including: a cover 1 having a receiving chamber 13; a light guide assembly 2, a light source assembly 4 and an insulation component 5 which are located in the receiving chamber 13; a metal frame 6 fixed at a side of the cover 1; a driving power supply assembly 7 disposed above the cover 1; and a panel 3 disposed beneath the cover 1 to close the receiving chamber 13. Both of the insulation component 5 and the light source assembly 4 are disposed on a side of the light guide assembly 2. The insulation component 5 includes a receiving groove 54, and the light source assembly 4 is received in the receiving groove 54 of the insulation component 5. The above-mentioned lighting device 100 can be an embedded flat panel lamp used for indoor illumination. In this example, the lighting device 100 is rectangular, and in other alternative examples, it can be circular, square, or has other shapes.

Hereinafter, various components and connection relationships among the various components in the lighting device 100 according to a preferred example of the present disclosure are described in details.

Figure 5:
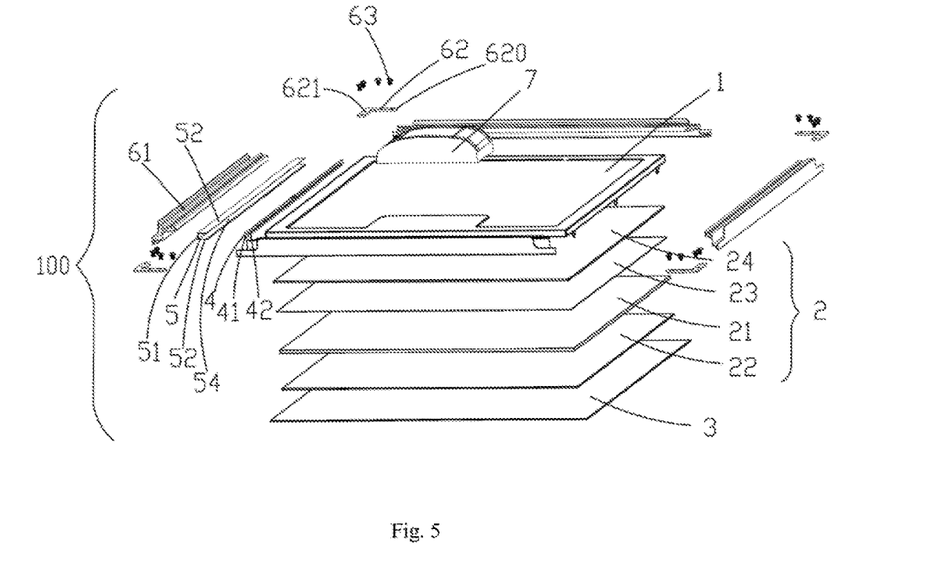
FIG. 5 is an exploded perspective view of a lighting device of the present disclosure.
Figure 6:
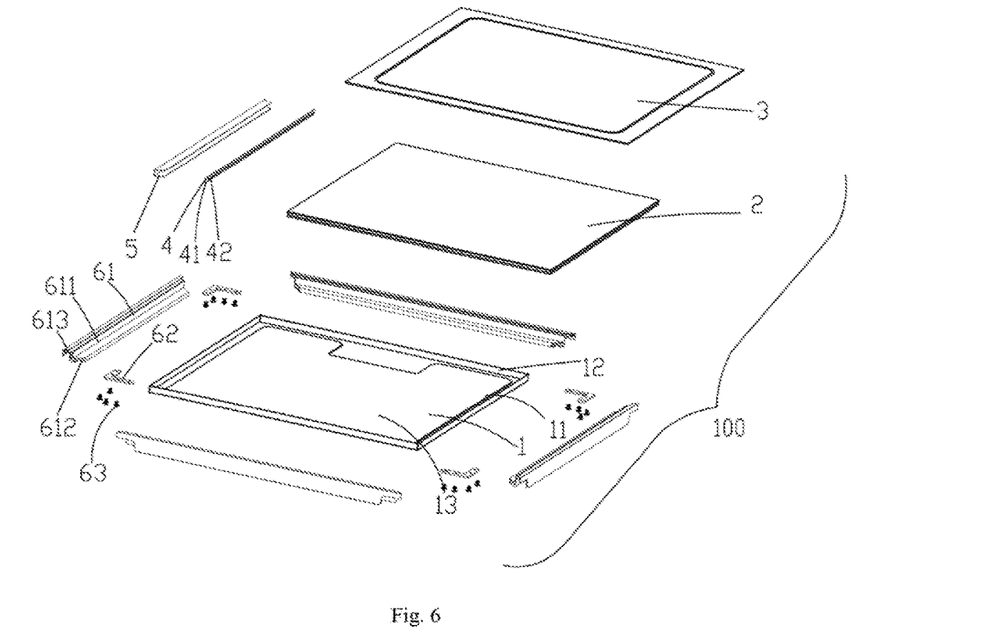
FIG. 6 is an exploded perspective view of a lighting device of the present disclosure viewed from another viewing angle.

As illustrated in FIG. 5 and FIG. 6, the cover 1 is in a form of rectangular block, and can be made of a metal material with good heat dissipation performance. Specifically, the cover 1 includes a top wall 11 and a side wall 12 extending downward from a periphery of the top wall 11; a receiving chamber 13 is delimited by the top wall 11 and the side wall 12.

As illustrated in FIGS. 5-9, the light guide assembly 2 is received in the receiving chamber 13 of the cover 1. The light guide assembly 2 includes a light guide plate 21, a diffusion plate 22 disposed beneath the light guide plate 21, and a light reflecting paper 23 and a flexible pad 24 which are sequentially stacked above the light guide plate 21. The flexible pad 24 is attached onto the top wall 1 of the cover 1. The light guide plate 21 can be made by following steps: providing an optical-graded acrylic sheet, and then printing light guide points onto a bottom surface of the optical-graded acrylic sheet by using a non-light-absorbing, high-tech material with extremely high reflectivity through a UV screen printing technology. Light generated from a lamp is received by the optical-graded acrylic sheet and stays on a surface of the optical-graded acrylic sheet. When incident onto the light guiding points, the reflected light will be diffused at all angles and then emits from a front surface of the light guide plate 21 by breaking the reflection condition. The diffusion plate 22 generally uses acrylic 2.0 plate or PC (polycarbonate) material for uniformly guiding the light from the light guide plate 21 and also for fogging the light guide points. The light reflecting paper 23 can also be referred to as a light reflecting film. The light reflecting paper 23 is internally reflective with light-reflecting beads, and is disposed between the flexible pad 24 and the light guide plate 21 to prevent the flexible pad 24 from absorbing light, thereby enhancing a lighting efficiency. The flexible pad 24 is made of a soft material and plays a role of cushioning and anti-vibration. In this example, the flexible pad 24 is made of PUV (polyurethane) cotton.

Figure 9:
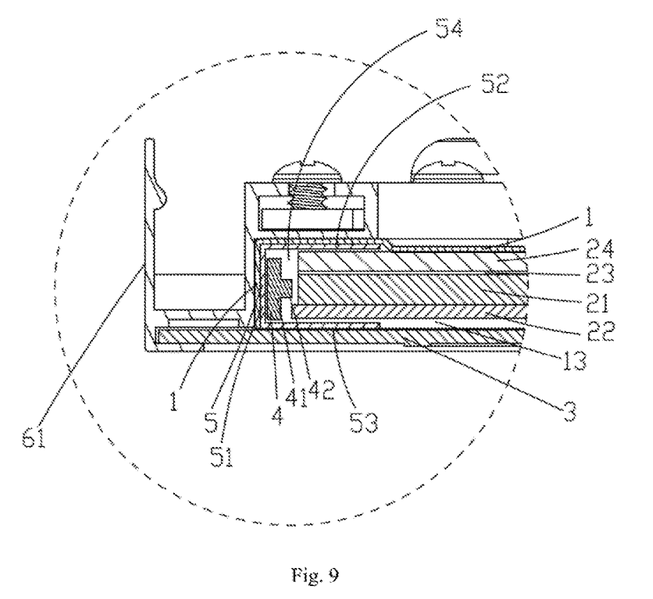
FIG. 9 is an enlarged view of details in the circle of FIG. 8.

As illustrated in FIGS. 5, 6 and 9, the light source assembly 4 includes a strip-shaped light source plate 41 and a plurality of light-emitting units 42 disposed on the light source plate 41. The plurality of light-emitting units 42 are arranged in a row along a longitudinal direction. Of course, the arrangement of the plurality of light-emitting units 42 can be various and is not limited to one row, but can also be arranged in two rows or three rows. In this example, the light-emitting unit 42 is a LED light source. The light source assembly 4 is horizontally disposed at a side of the light guide assembly 2 and emits light towards a side surface of the light guide plate 21 of the light guide assembly 2.

As illustrated in FIGS. 5, 6, and 9, the insulation component 5 is made of an insulation material and is in a form of U-shaped strip. Specifically, the insulation component 5 includes a first insulation wall 51, as well as a second insulation wall 52 and a third insulation wall 53 connected with two sides of the first insulation wall 51 respectively. A receiving groove 54 is delimited by the first insulation wall 51, the second insulation wall 52 and the third insulation wall 53. The insulation component 5 is horizontally disposed at a side of the light guide assembly 2 and covers one end of the light guide assembly 2. That is, one end of the light guide assembly 2 is received in the receiving groove 54. When the light guide assembly 2, the light source assembly 4 and the insulation component 5 are all received in the cover 1, an outer surface of the first insulation wall 51 of the insulation component 5 is attached onto an inner surface of the side wall 12 of the cover 1, and an outer surface of the second insulation wall 52 is attached onto an inner surface of the top wall 11 of the cover 12. In addition, the light source assembly 4 is located on a surface of an inner wall of the receiving groove 54 of the insulation component 5. Specifically, the light source plate 41 is attached onto the inner surface of the first insulation wall 51, and a direction of light emitted from the plurality of light-emitting units 42 is directed to the light guide assembly 2. In this way, the light source assembly 4 is horizontally disposed between the first insulation wall 51 and the light guide assembly 2. An adhesive such as a double-sided tape and a heat-conductive adhesive can be used between the light source plate 41 and the first insulation wall 51 to fix the light source plate 41 onto the first insulation wall 51, so that the light source assembly 4 is fixed in the insulation component 5. Similarly, when the insulation component 5, along with the light source assembly 4 and the light guide assembly 2, is assembled in the receiving chamber 13 of the cover 1, an adhesive such as a double-sided tape and a heat-conductive adhesive can be used to fix the insulation component 5 and the light guide assembly 2 onto the cover 1.

As illustrated in FIGS. 1-7 and FIG. 9, the metal frame 6 is a rectangular frame and is disposed around the cover 1. Specifically, the metal frame 6 includes: four frame bars 61 sequentially connected; four connection pieces 62 for connecting adjacent frame bars 61 together; and a plurality of screws 63 for locking the connection pieces 62 to the frame bars 61.

Figure 7:
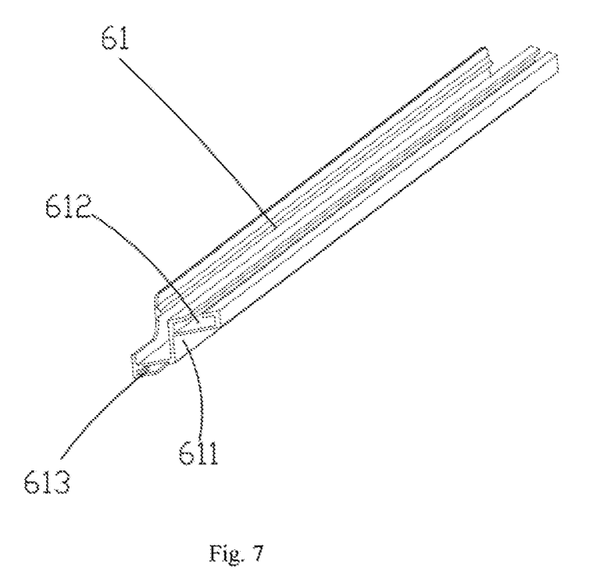
FIG. 7 is a schematic perspective view of a metal frame in a lighting device of the present disclosure.

Each of the frame bars 61 includes a recessed portion 611 extending upwards along a length direction of the frame bar 61, a first clamping slot 612, and a second clamping slot 613. Specifically, the recessed portion 611 has two walls perpendicular to each other (not labeled); and an edge portion (not labeled) at a periphery of the cover 1, i.e., a portion of the top wall and the side wall connected with each other, is received in the recessed portion 611. The first clamping slot 612 is configured to be engaged with the connection piece 62 by receiving the connection piece 62 inserted therein, and the second clamping slot 613 is configured to be engaged with the panel 3 by receiving the panel 3 inserted therein. The connection piece 62 has a right angle shape, and includes two connection parts 620 each in a form of flat plate. Each of the connection parts 620 is provided with a plurality of through holes 621. The connection parts of the connection piece 62 are respectively inserted into and received by ends of the first clamping slots 612 of adjacent two frame bars 61, and a screw 63 is driven to pass through the through holes 621 to be locked therein so that the screw 63 is fixedly connected with the frame bar 61. In this way, with the connection piece 62 and the screw 63, the connection between adjacent two frame bars 61 can be achieved.

Figure 3:
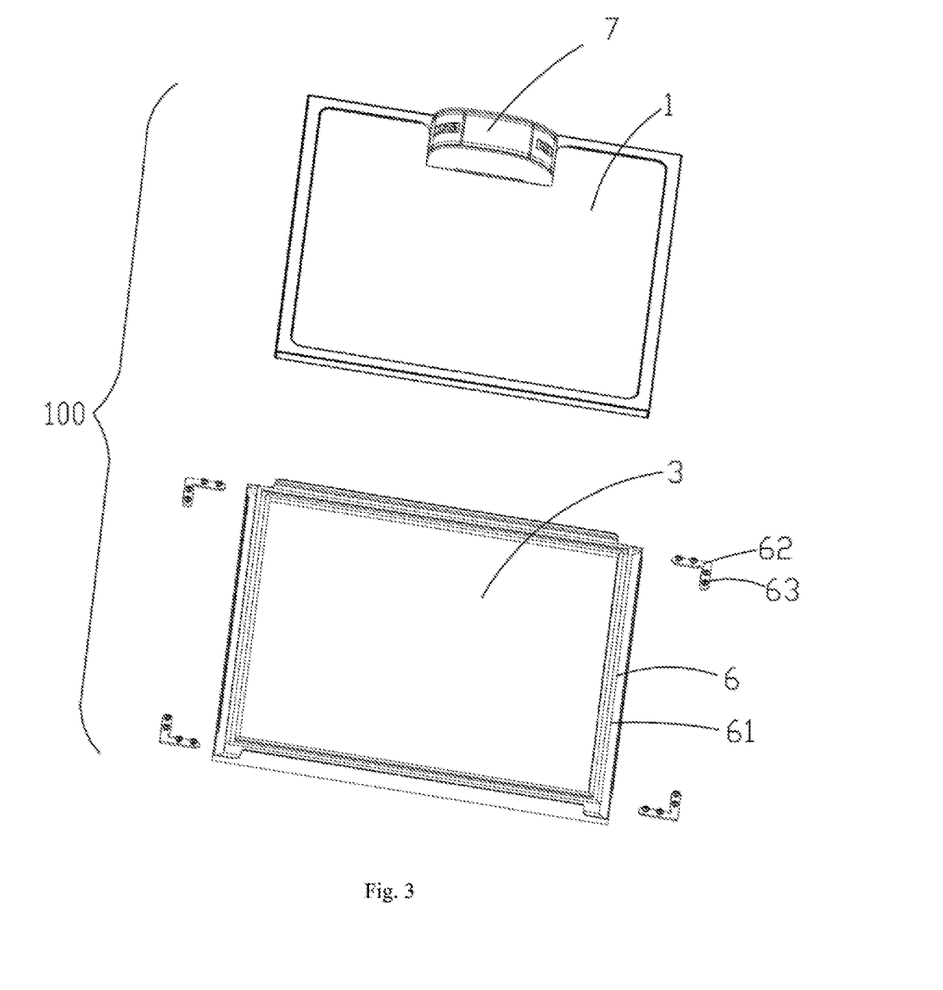
FIG. 3 is a partially exploded view based on FIG. 1.
Figure 4:
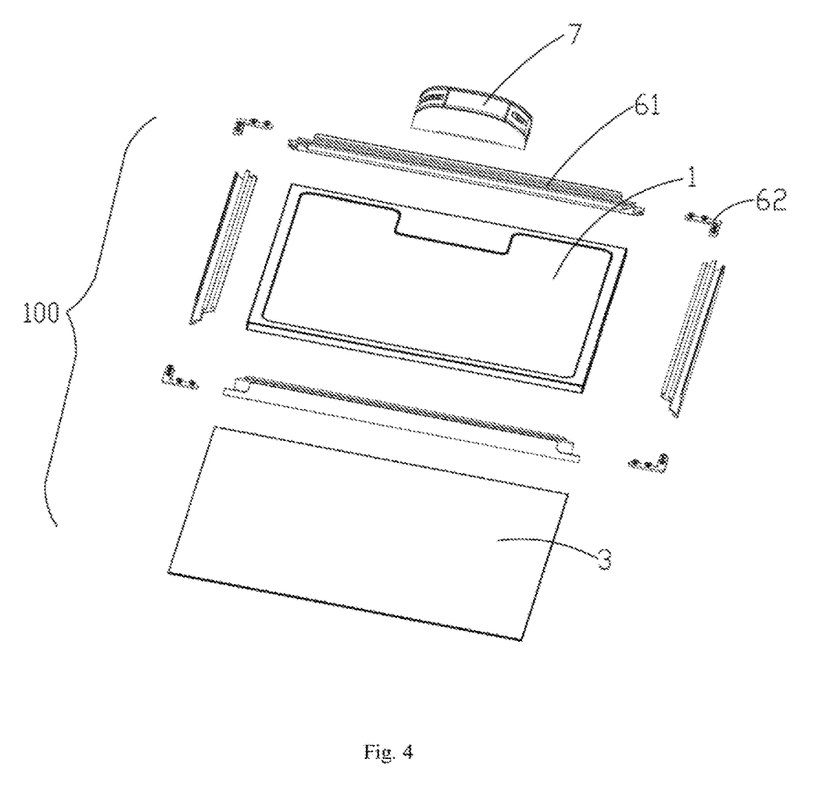
FIG. 4 is a further exploded view based on FIG. 3.
Figure 8:
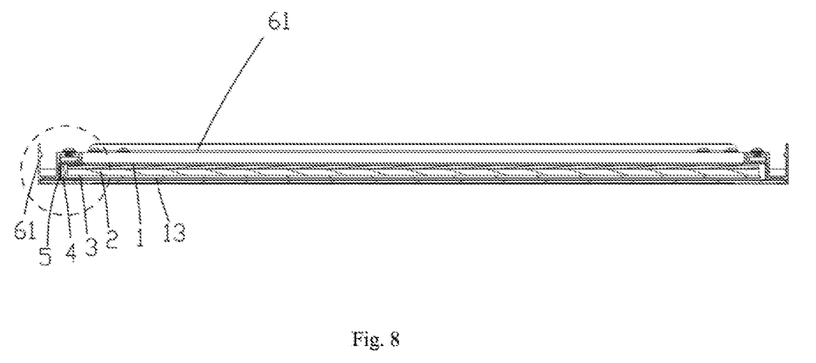
FIG. 8 is a sectional view taken along line A-A in FIG. 1.

As illustrated in FIG. 3, FIG. 8 and FIG. 9, the panel 3 is made of a transparent material and is in a form of flat plate. The panel 3 is assembled to the metal frame 6 and can seal the receiving chamber 13 of the cover 1. Specifically, an edge portion of the panel 3 is inserted into and received by the second clamping slot 613 of the frame bar 61, so that the panel 3 can be connected with the metal frame 6.

Figure 1:
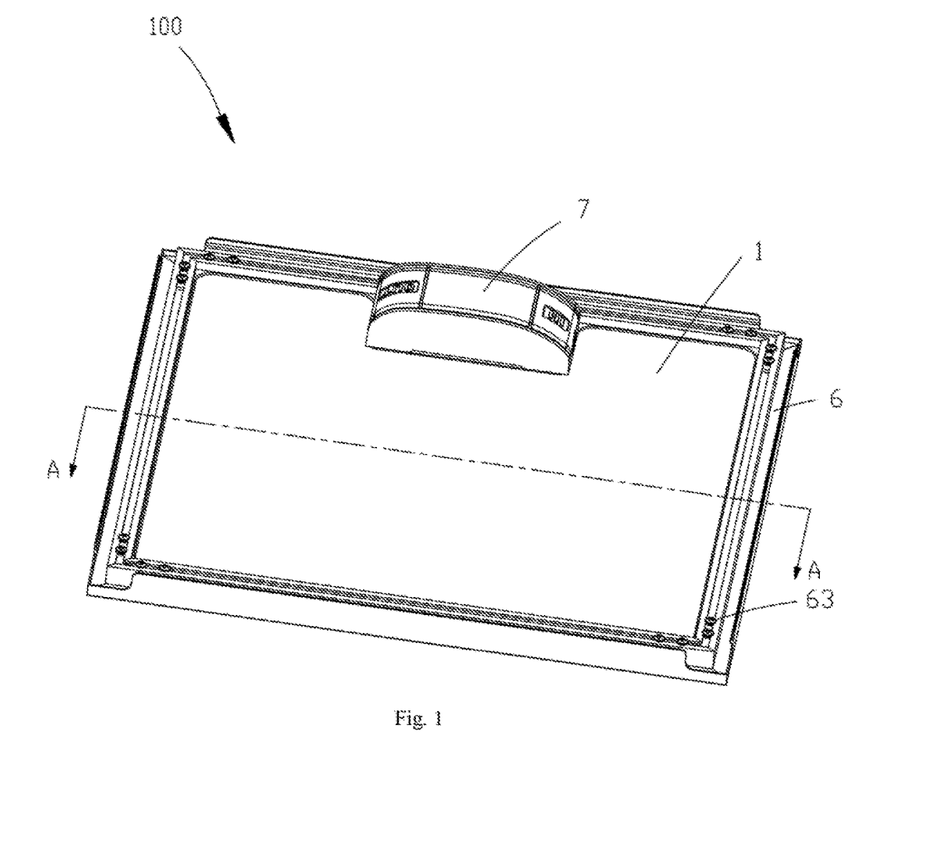
FIG. 1 is a perspective view of a lighting device of the present disclosure.
Figure 2:
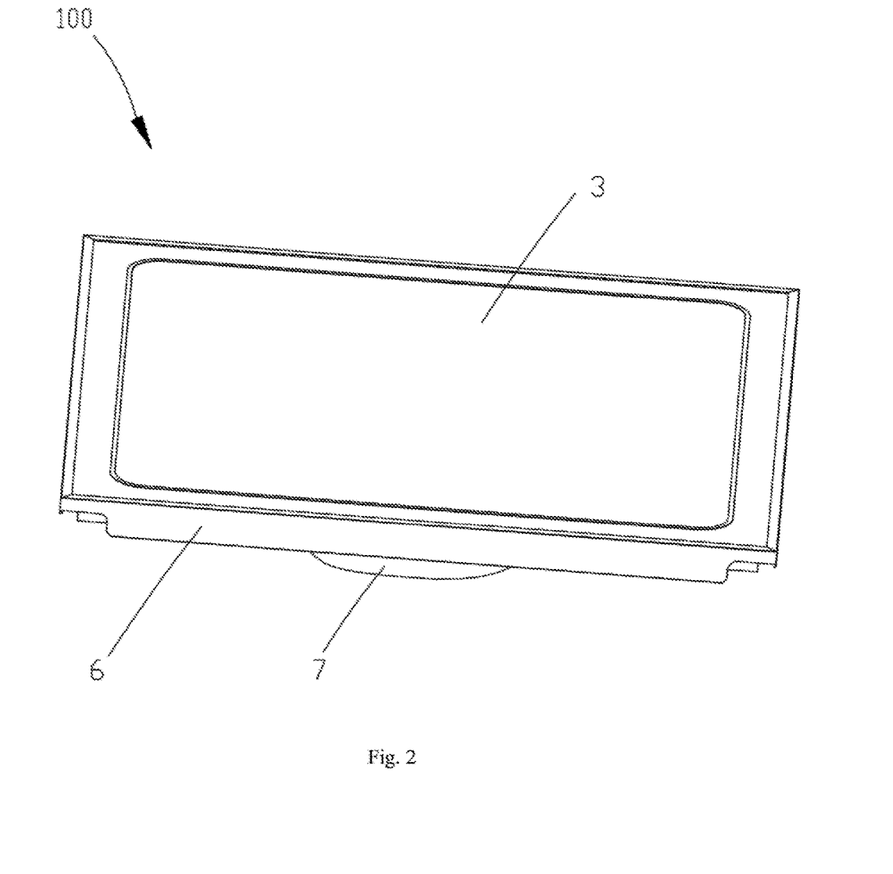
FIG. 2 is a perspective view of FIG. 1 from another viewing angle.

As illustrated in FIG. 1 and FIG. 3, the driving power supply assembly 7 is fixed onto an upper surface of the cover 1. It can be fixed onto the cover 1 by means of a screwed connection, or can be connected to the cover 1 by using an adhesive or a buckle. The driving power supply assembly 7 is electrically connected with the light source assembly 4, and includes several components including but not limited to an LED driving controller chip, a rectifier chip, a resistor, a capacitor, a fuse, coils, etc., all mounted on a substrate of the driving power supply assembly 7. In this example, the driving power supply assembly 7 adopts a non-isolated power supply, which can have both of a light intensity adjusting function and a color adjusting function, or can only have a color adjusting function but no light intensity adjusting function.

As illustrated in FIGS. 1-9, the assembling process includes steps as follows.

Step 1: firstly, assembling the light source assembly 4, the insulation component 5, the light guide assembly 2 and the cover 1 into a module.

Specifically, adhering the light source assembly 4 onto the insulation component 5, adhering the insulation component 5 onto an inner surface of the side wall 12 of the cover 1, inserting an end of the light guide assembly 2 into the insulation component 5 and then horizontally placing the light guide assembly 2 in the cover 1.

Step 2, connecting three frame bars 61 of the metal frame 6 together by using connection pieces 62 and screws 63.

Step 3, attaching an edge portion of the module assembled in Step 1 onto the recessed portion 611 of the metal frame 6.

Step 4, inserting the panel 3 into the second clamping slot 613 of the metal frame 6.

Step 5, connecting the remaining metal frame bar 61 with the three metal frame bars 61 which have been connected together so that the four metal frame bars 61 are assembled into a metal frame 1 and the cover 1 is just fixed onto an inner side of the metal frame 1.

Step 6, fixing the driving power supply assembly 7 onto an upper surface of the cover 1 by screws.

Through the assembling steps as described above, the lighting device 100 of the present example is assembled.

In this example, the light source assembly 4 is disposed in the receiving chamber of the insulation component 5, thereby increasing the creepage distance between the light source plate 41 and the metal frame 6 and also increasing the withstanding voltage performance of the lighting device, so that a non-isolated power supply can be used in the lighting devices of the present example. That is, the light source assembly 4 can be supplied with a higher voltage, for example, a voltage higher than 60V can be used. Herein, the creepage distance is defined as follows: under different usage conditions, an insulation material around a conductor will be charged due to electrical polarization effect, and the creepage distance is a radius of a charged region between two conductive components, measured along an insulation surface.

The lighting device 100 of the present disclosure adopts a non-isolated power supply, thus the cost is reduced, and meanwhile the safety performance is guaranteed.

The present disclosure discloses a lighting device, including: a cover including a top wall and a side wall extending downwards from the top wall, a receiving chamber being delimited by the top wall and the side wall; an insulation component located on an inner surface of the side wall of the cover and provided with a receiving groove, and the insulation component the insulation component may also be an insulating layer attached onto the inner surface of the side wall of the cover; a light source assembly located on a surface of an inner wall of the receiving groove of the insulation component; a light guide assembly received in the receiving chamber of the cover, having an end received in the receiving groove of the insulation component; and a metal frame fixed at a periphery of the cover. The lighting device of the present disclosure utilizes an insulation component to increase the creepage distance between the light source assembly and the metal frame, and also enhance the withstanding voltage performance of the lighting device, so that a solution of a non-isolated power supply can be adopted by the lighting device. That is, a higher voltage can be used to supply power for the light source assembly. Because the lighting device of the present disclosure adopts the solution of non-isolated power supply, the cost is reduced, and meanwhile the safety performance is guaranteed.

The objective of the present disclosure is to solve the above-mentioned problems, and to provide a lighting device with high withstanding voltage performance.

The present disclosure provides a lighting device, including:

a cover including a top wall and a side wall extending downwards from the top wall; a receiving chamber being delimited by the top wall and the side wall;

an insulation component located on an inner surface of the side wall of the cover and provided with a receiving groove;

a light source assembly located on a surface of an inner wall of the receiving groove of the insulation component;

a light guide assembly received in the receiving chamber of the cover, having an end received in the receiving groove of the insulation component; and a metal frame fixed at a periphery of the cover.

Further, the lighting device further includes a driving power supply assembly disposed on an upper surface of the cover. The driving power supply assembly is attached onto the upper surface of the cover and is electrically connected with the light source assembly to supply power to the light source assembly.

Further, the driving power supply assembly adopts a non-isolated power supply.

Further, the lighting device further includes a panel located beneath the light guide assembly.

Further, the metal frame is connected with the cover and the panel, respectively.

Further, the metal frame includes a plurality of frame bars connected with each other, and the plurality of frame bars are connected by a plurality of connection pieces.

Further, each of the frame bars is provided with a recessed portion configured to receive an edge of the cover, a first clamping slot configured to be engaged with the connection piece by receiving the connection piece inserted therein, and a second clamping slot configured to be engaged with the panel by receiving the panel inserted therein.

Further, the recessed portion has two walls perpendicular to each other, and a portion of the top wall and the side wall of the cover connected with each other is received in the recessed portion.

Further, each of the connection pieces is in a right angle shape and includes two strip-shaped connection parts. Each of the connection parts is provided with a plurality of through holes through which screws are configured to pass.

Further, the insulation component includes a first insulation wall, as well as a second insulation wall and a third insulation wall connected with two sides of the first insulation wall, respectively. The receiving groove is delimited by the first insulation wall, the second insulation wall and the third insulation wall.

Further, the light source assembly includes a light source plate and a plurality of light-emitting units disposed on the light source plate, the light source plate is attached onto the first insulation wall.

Further, the light guide assembly includes a light guide plate, a diffusion plate located beneath the light guide plate, and a light reflecting paper and a flexible pad sequentially stacked above the light guide plate.

According to another, a method of producing a lighting device is provided. The method may include providing a cover that has a top wall and a side wall extending downwards from the top wall, and providing a receiving chamber that is delimited by the top wall and the side wall; providing an insulation component that is located on an inner surface of the side wall of the cover and provided with a receiving groove or is an insulating layer attached onto the inner surface of the side wall of the cover; providing a light source assembly that is located on a surface of an inner wall of the receiving groove of the insulation component; providing a light guide assembly that is received in the receiving chamber of the cover, where the light guide assembly includes an end received in the receiving groove of the insulation component; and fixing a metal frame at a periphery of the cover.

Optionally or alternatively, the method may further include disposing a driving power supply assembly on an upper surface of the cover, wherein the driving power supply assembly is attached onto the upper surface of the cover and is electrically connected with the light source assembly to supply power to the light source assembly.

Optionally or alternatively, in the method, the driving power supply assembly may adopt a non-isolated power supply.

Optionally or alternatively, the method may further include providing a panel located beneath the light guide assembly.

Optionally or alternatively, in the method, the metal frame is connected with the cover and the panel, respectively.

Optionally or alternatively, in the method, the metal frame may include a plurality of frame bars connected with each other, and the plurality of frame bars may be connected by a plurality of connection pieces.

Optionally or alternatively, in the method, each of the frame bars is provided with a recessed portion configured to receive an edge of the cover, a first clamping slot configured to be engaged with the connection piece by receiving the connection piece inserted therein, and a second clamping slot configured to be engaged with the panel by receiving the panel inserted therein.

Optionally or alternatively, in the method, the recessed portion has two walls perpendicular to each other, and a portion of the top wall and the side wall of the cover connected with each other is received in the recessed portion.

Compared with the prior art, the lighting device of the present disclosure utilizes an insulation component to increase the creepage distance between the light source assembly and the metal frame, and also enhance the withstanding voltage performance of the lighting device, so that a solution of a non-isolated power supply can be adopted by the lighting device. That is, a higher voltage can be used to supply power for the light source assembly. Because the lighting device of the present disclosure adopts the solution of non-isolated power supply, the cost is reduced, and meanwhile the safety performance is guaranteed.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

The specific examples described above further describe the objectives, technical solutions and beneficial effects of the present disclosure in detail. It should be understood that above descriptions are merely specific examples of the present disclosure and are not intended to limit the present disclosure. Any modification, equivalent replacement, improvement, etc. made within the spirit and principle of the present disclosure should be included in the protection scope of the present disclosure.

The invention claimed is:

1. A lighting device, comprising:
   a cover comprising a top wall and a side wall extending downwards from the top wall, and a receiving chamber defined by the top wall and the side wall;
   an insulation component located on an inner surface of the side wall of the cover and defining a receiving groove;
   a light source assembly located on a surface of an inner wall of the receiving groove of the insulation component;
   a light guide assembly received in the receiving chamber of the cover, wherein the light guide assembly comprises an end received in the receiving groove of the insulation component;
   a metal frame fixed at a periphery of the cover; and
   a driving power supply assembly disposed on an upper surface of the cover, wherein the driving power supply assembly is attached onto the upper surface of the cover and is electrically connected with the light source assembly to supply power to the light source assembly.

2. The lighting device according to claim 1, wherein the driving power supply assembly adopts a non-isolated power supply.

3. The lighting device according to claim 1, wherein the light guide assembly comprises a light guide plate, a diffusion plate located beneath the light guide plate, and a light reflecting paper and a flexible pad sequentially stacked above the light guide plate.

4. The lighting device according to claim 1, wherein the insulation component comprises an insulating layer attached onto the inner surface of the side wall of the cover.

5. The lighting device according to claim 1, wherein the insulation component comprises a first insulation wall, as well as a second insulation wall and a third insulation wall connected with two sides of the first insulation wall, respectively, and the receiving groove is delimited by the first insulation wall, the second insulation wall and the third insulation wall.

6. The lighting device according to claim 5, wherein the light source assembly comprises a light source plate and a plurality of light-emitting units disposed on the light source plate, and the light source plate is attached onto the first insulation wall.

7. The lighting device according to claim 1, further comprising a panel located beneath the light guide assembly.

8. The lighting device according to claim 7, wherein the metal frame is connected with the cover and the panel, respectively.

9. The lighting device according to claim 8, wherein the metal frame comprises a plurality of frame bars connected with each other, and the plurality of frame bars are connected by a plurality of connection pieces.

10. The lighting device according to claim 9, wherein each of the connection pieces is in a right angle shape and comprises two strip-shaped connection parts, and each of the connection parts is provided with a plurality of through holes, through which a screw is configured to pass.

11. The lighting device according to claim 9, wherein each of the frame bars is provided with a recessed portion configured to receive an edge of the cover, a first clamping slot configured to be engaged with the connection piece by receiving the connection piece inserted therein, and a second clamping slot configured to be engaged with the panel by receiving the panel inserted therein.

12. The lighting device according to claim 11, wherein the recessed portion has two walls perpendicular to each other, and a portion of the top wall and the side wall of the cover connected with each other is received in the recessed portion.

13. A method of producing a lighting device, comprising:
    providing a cover that comprises a top wall and a side wall extending downwards from the top wall, and providing a receiving chamber that is defined by the top wall and the side wall;
    providing an insulation component located on an inner surface of the side wall of the cover and defining a receiving groove;
    providing a light source assembly that is located on a surface of an inner wall of the receiving groove of the insulation component;
    providing a light guide assembly that is received in the receiving chamber of the cover, wherein the light guide assembly comprises an end received in the receiving groove of the insulation component;
    fixing a metal frame at a periphery of the cover; and
    disposing a driving power supply assembly on an upper surface of the cover, wherein the driving power supply assembly is attached onto the upper surface of the cover and is electrically connected with the light source assembly to supply power to the light source assembly.

14. The method according to claim 13, wherein the driving power supply assembly adopts a non-isolated power supply.

15. The method according to claim 13, wherein the insulation component comprises an insulating layer attached onto the inner surface of the side wall of the cover.

16. The method according to claim 13, further comprising providing a panel located beneath the light guide assembly.

17. The method according to claim 16, wherein the metal frame is connected with the cover and the panel, respectively.

18. The method according to claim 17, wherein the metal frame comprises a plurality of frame bars connected with each other, and the plurality of frame bars are connected by a plurality of connection pieces.

19. The method according to claim 18, wherein each of the frame bars is provided with a recessed portion configured to receive an edge of the cover, a first clamping slot configured to be engaged with the connection piece by receiving the connection piece inserted therein, and a second clamping slot configured to be engaged with the panel by receiving the panel inserted therein.

20. The method according to claim 19, wherein the recessed portion has two walls perpendicular to each other, and a portion of the top wall and the side wall of the cover connected with each other is received in the recessed portion.

* * * * *